United States Patent
Chiba et al.

(10) Patent No.: US 10,701,085 B2
(45) Date of Patent: Jun. 30, 2020

(54) COMMUNICATION PARTNER MALIGNANCY CALCULATION DEVICE, COMMUNICATION PARTNER MALIGNANCY CALCULATION METHOD, AND COMMUNICATION PARTNER MALIGNANCY CALCULATION PROGRAM

(71) Applicant: NIPPON TELEGRAPH AND TELEPHONE CORPORATION, Chiyoda-ku (JP)

(72) Inventors: Daiki Chiba, Musashino (JP); Takeshi Yagi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 239 days.

(21) Appl. No.: 15/554,136

(22) PCT Filed: Feb. 12, 2016

(86) PCT No.: PCT/JP2016/054102
§ 371 (c)(1),
(2) Date: Aug. 28, 2017

(87) PCT Pub. No.: WO2016/140038
PCT Pub. Date: Sep. 9, 2016

(65) Prior Publication Data
US 2018/0270254 A1    Sep. 20, 2018

(30) Foreign Application Priority Data
Mar. 5, 2015    (JP) ................. 2015-043940

(51) Int. Cl.
*H04L 29/06*    (2006.01)
*G06F 21/55*    (2013.01)
*G06N 20/00*    (2019.01)

(52) U.S. Cl.
CPC .............. *H04L 63/14* (2013.01); *G06F 21/55* (2013.01); *G06N 20/00* (2019.01)

(58) Field of Classification Search
CPC .......... H04L 63/14; G06N 20/00; G06F 21/55
See application file for complete search history.

(56) References Cited

U.S. PATENT DOCUMENTS

| | | | |
|---|---|---|---|
| 8,762,298 B1 * | 6/2014 | Ranjan | G06N 5/02 706/12 |
| 2004/0081343 A1 * | 4/2004 | Takeo | G06T 7/0012 382/131 |

(Continued)

FOREIGN PATENT DOCUMENTS

JP    2012-175296 A    9/2012

OTHER PUBLICATIONS

Ahmed Al-Zurfi et al., "Automated Glioma Grading based on an Efficient Ensemble Design of a Multiple Classifier System using Deep Iteration Neural Network Matrix," Sep. 2018, pp. 1-6. (Year: 2018).*

(Continued)

*Primary Examiner* — Luu T Pham
*Assistant Examiner* — Canh Le
(74) *Attorney, Agent, or Firm* — Oblon, McClelland, Maier & Neustadt, L.L.P.

(57) ABSTRACT

Communication partners known to be malignant or benign are input to a known communication partner input unit, a subject communication partner whose malignancy is to be calculated is input to a subject communication partner input unit, a characteristic extractor extracts changes over time in whether the known communication partners and the subject communication partner are listed at a past given time point on a malignancy communication partner list and a benign communication partner list, and a malignancy calculator (Continued)

calculates malignancy of the subject communication partner on the basis of the characteristic information about the known communication partners and the subject communication partner.

5 Claims, 16 Drawing Sheets

(56) References Cited

U.S. PATENT DOCUMENTS

| | | | | |
|---|---|---|---|---|
| 2005/0022008 | A1* | 1/2005 | Goodman | G06Q 10/107 726/4 |
| 2008/0115221 | A1* | 5/2008 | Yun | G06F 21/552 726/25 |
| 2010/0121841 | A1* | 5/2010 | He | G06F 16/9535 707/722 |
| 2011/0271343 | A1* | 11/2011 | Kim | G06F 21/566 726/23 |
| 2012/0158626 | A1* | 6/2012 | Zhu | G06F 21/56 706/13 |
| 2014/0283070 | A1* | 9/2014 | Lewis | H04L 63/1433 726/23 |
| 2014/0298460 | A1* | 10/2014 | Xue | H04L 63/1425 726/23 |
| 2016/0239899 | A1* | 8/2016 | Kamdar | H04L 61/302 |

OTHER PUBLICATIONS

Michael Mayhew et al., "Use of Machine Learning in Big Data Analytics for Insider THreat Detection," IEEE 2015, pp. 915-922. (Year: 2015).*

Extended European Search Report dated Aug. 27, 2018 in Patent Application No. 16758732.8, 7 pages.

International Search Report dated May 17, 2016, in PCT/JP2016/054102, filed Feb. 12, 2016.

Antonakakis et al., "Building a Dynamic Reputation System for DNS", Proc. USENIX Conference on Security, 2010, 17 pages.

Bilge et al., "EXPOSURE: Finding Malicious Domains Using Passive DNS Analysis", Proc. NDSS, 2011, pp. 1-17.

* cited by examiner

FIG.2

| SERIAL NUMBER | TYPE | COMMUNICATION PARTNER |
|---|---|---|
| 1 | DOMAIN NAME | www.example.com |
| 2 | DOMAIN NAME | www.example.net |
| ... | ... | ... |
| 101 | URL | http://www.example.com/abcdef/index.php?test=123 |
| 102 | URL | http://www.example.net/index.php?num=2 |
| ... | ... | ... |
| 201 | IP ADDRESS | 192.0.2.1 |
| 202 | IP ADDRESS | 203.0.113.2 |
| ... | ... | ... |

FIG.3

| SERIAL NUMBER | LABEL | TYPE | COMMUNICATION PARTNER |
|---|---|---|---|
| 1 | BENIGN | DOMAIN NAME | foo.example.com |
| 2 | MALIGNANT | DOMAIN NAME | bar.example.net |
| 3 | MALIGNANT | DOMAIN NAME | hoge.example.net |
| ... | | ... | ... |
| 101 | BENIGN | URL | http://foo.example.com/abcdef/index.php?test=123 |
| 102 | MALIGNANT | URL | http://bar.example.net/index.php?num=2 |
| 103 | MALIGNANT | URL | http://hoge.example.net/test/index.php |
| ... | | ... | ... |
| 201 | MALIGNANT | IP ADDRESS | 192.0.2.101 |
| 202 | BENIGN | IP ADDRESS | 203.0.113.202 |
| 203 | MALIGNANT | IP ADDRESS | 203.0.113.51 |
| ... | | ... | ... |

FIG.4

| SERIAL NUMBER | COMMUNICATION PARTNER | COMMUNICATION PARTNER LIST | LISTED/UNLISTED | | | |
|---|---|---|---|---|---|---|
| | | | ... | t-2 | t-1 | t |
| 1 | www.example.com | BENIGN COMMUNICATION PARTNER LIST 1 | ... | LISTED | LISTED | LISTED |
| 2 | www.example.com | BENIGN COMMUNICATION PARTNER LIST 2 | ... | UNLISTED | LISTED | LISTED |
| ... | ... | ... | ... | ... | ... | ... |
| 11 | www.example.com | MALIGNANT COMMUNICATION PARTNER LIST 1 | ... | LISTED | LISTED | LISTED |
| 12 | www.example.com | MALIGNANT COMMUNICATION PARTNER LIST 2 | ... | LISTED | UNLISTED | UNLISTED |
| ... | ... | ... | ... | ... | ... | ... |
| 21 | www.example.net | BENIGN COMMUNICATION PARTNER LIST 1 | ... | UNLISTED | UNLISTED | UNLISTED |
| 22 | www.example.net | BENIGN COMMUNICATION PARTNER LIST 2 | ... | LISTED | LISTED | UNLISTED |
| ... | ... | ... | ... | ... | ... | ... |
| 31 | www.example.net | MALIGNANT COMMUNICATION PARTNER LIST 1 | ... | UNLISTED | UNLISTED | UNLISTED |
| 32 | www.example.net | MALIGNANT COMMUNICATION PARTNER LIST 2 | ... | UNLISTED | LISTED | LISTED |
| ... | ... | ... | ... | ... | ... | ... |

FIG.5

| SERIAL NUMBER | COMMUNICATION PARTNER | CHARACTERISTIC INFORMATION($t-2 \leq \tau \leq t$) | | | | | |
|---|---|---|---|---|---|---|---|
| | | BENIGN COMMUNICATION PARTNER LIST 1 | BENIGN COMMUNICATION PARTNER LIST 2 | ... | MALIGNANT COMMUNICATION PARTNER LIST 1 | MALIGNANT COMMUNICATION PARTNER LIST 2 | ... |
| 1 | www.example.com | STABLY LISTED | LISTING STARTED HALFWAY | ... | STABLY LISTED | LISTING ENDED HALFWAY | ... |
| 2 | www.example.net | UNLISTED | LISTING ENDED HALFWAY | ... | UNLISTED | LISTING STARTED HALFWAY | ... |
| ... | ... | ... | ... | ... | ... | ... | ... |

FIG.6

| SERIAL NUMBER | COMMUNICATION PARTNER | CHARACTERISTIC INFORMATION($t-2 \leq \tau \leq t$) | | | |
|---|---|---|---|---|---|
| | | BENIGN COMMUNICATION PARTNER LIST 1 & BENIGN COMMUNICATION PARTNER LIST 2 | BENIGN COMMUNICATION PARTNER LIST 1 & MALIGNANT COMMUNICATION PARTNER LIST 1 | BENIGN COMMUNICATION PARTNER LIST 1 & MALIGNANT COMMUNICATION PARTNER LIST 2 | ... |
| 1 | www.example.com | STABLY LISTED & LISTING STARTED HALFWAY | BOTH STABLY LISTED | STABLY LISTED & LISTING ENDED HALFWAY | ... |
| 2 | www.example.net | UNLISTED & LISTING ENDED HALFWAY | BOTH UNLISTED | UNLISTED & LISTING STARTED HALFWAY | ... |
| ... | ... | ... | ... | ... | ... |

FIG.7

| SERIAL NUMBER | DOMAIN NAME | TIMESTAMP | IP ADDRESS |
|---|---|---|---|
| 1 | www.example.com | 2015-01-01 00:00:00 | 192.0.2.1 |
| 2 | www.example.com | 2015-01-01 01:00:00 | 192.0.2.2 |
| ... | ... | ... | ... |
| 101 | foo.example.com | 2015-01-01 00:00:00 | 192.0.2.101 |
| 102 | foo.example.com | 2015-01-01 01:00:00 | 192.0.2.102 |
| ... | ... | ... | ... |
| 201 | example.com | 2015-01-01 00:00:00 | 192.0.2.201, 192.0.2.202 |
| 202 | example.com | 2015-01-01 01:00:00 | 192.0.2.201, 192.0.2.202 |
| ... | ... | ... | ... |
| 301 | www.example.net | 2015-01-01 00:00:00 | 203.0.113.1 |
| 302 | www.example.net | 2015-02-01 01:00:00 | 203.0.113.2 |
| ... | ... | ... | ... |
| 401 | bar.example.net | 2015-02-02 01:00:00 | 203.0.113.202 |
| ... | ... | ... | ... |
| 501 | hoge.example.net | 2015-02-03 01:00:00 | 203.0.113.51 |
| ... | ... | ... | ... |

FIG.8

| SERIAL NUMBER | IP ADDRESS | ADDRESS PREFIX | AS NUMBER | ORGANIZATION NAME | COUN-TRY | RIR | ADDRESS ASSIGNMENT DATE |
|---|---|---|---|---|---|---|---|
| 1 | 192.0.2.1 | 192.0.2.0/24 | 64501 | TEST-NET-1 | US | ARIN | JAN/01/2001 |
| 2 | 192.0.2.101 | 192.0.2.0/24 | 64501 | TEST-NET-1 | US | ARIN | JAN/01/2001 |
| 3 | 192.0.2.201 | 192.0.2.0/24 | 64501 | TEST-NET-1 | US | ARIN | JAN/01/2001 |
| ⋮ | ⋮ | ⋮ | ⋮ | ⋮ | ⋮ | ⋮ | ⋮ |
| 101 | 203.0.113.2 | 203.0.113.0/24 | 64502 | TEST-NET-2 | US | ARIN | FEB/01/2001 |
| 102 | 203.0.113.202 | 203.0.113.0/24 | 64502 | TEST-NET-2 | US | ARIN | MAR/01/2001 |
| 103 | 203.0.113.51 | 203.0.113.0/24 | 64502 | TEST-NET-2 | US | ARIN | APR/01/2001 |
| ⋮ | ⋮ | ⋮ | ⋮ | ⋮ | ⋮ | ⋮ | ⋮ |

| SERIAL NUMBER | COMMUNICATION PARTNER | IP ADDRESS GROUP RELEVANT TO COMMUNICATION PARTNER |
|---|---|---|
| 1 | www.example.com | 192.0.2.1, 192.0.2.2, 192.0.2.201, 192.0.2.202 |
| 2 | foo.example.com | 192.0.2.101, 192.0.2.102, 192.0.2.201, 192.0.2.202 |
| 3 | example.com | 192.0.2.201, 192.0.2.202 |
| ... | ... | ... |
| 101 | www.example.net | 203.0.113.1, 203.0.113.2, 203.0.113.101 |
| 102 | bar.example.net | 203.0.113.201, 203.0.113.202, 203.0.113.101 |
| 103 | hoge.example.net | 203.0.113.51, 203.0.113.101 |
| 104 | example.net | 203.0.113.101 |
| ... | ... | ... |

FIG.11

| SERIAL NUMBER | COMMUNICATION PARTNER | CHARACTERISTIC INFORMATION | | | | | | |
|---|---|---|---|---|---|---|---|---|
| | | RELEVANT IP ADDRESS | NUMBER OF ADDRESS PREFIXES | NUMBER OF AS NUMBERS | NUMBER OF ORGANIZATION NAMES | NUMBER OF COUN-TRIES | NUMBER OF RIRS | NUMBER OF DAYS DURING WHICH ADDRESS IS ASSIGNED | ... |
| 1 | www.example.com | 4 | 1 | 1 | 1 | 1 | 1 | 1 | ... |
| 2 | foo.example.com | 4 | 1 | 1 | 2 | 2 | 1 | 1 | ... |
| 3 | example.com | 2 | 1 | 1 | 1 | 1 | 1 | 1 | ... |
| ... | ... | ... | ... | ... | ... | ... | ... | ... | ... |
| 101 | www.example.net | 3 | 1 | 1 | 3 | 1 | 1 | 2 | ... |
| 102 | bar.example.net | 3 | 1 | 1 | 3 | 1 | 1 | 2 | ... |
| 103 | hoge.example.net | 2 | 1 | 1 | 1 | 1 | 1 | 1 | ... |
| 104 | example.net | 1 | 1 | 1 | 1 | 1 | 1 | 1 | ... |
| ... | ... | ... | ... | ... | ... | ... | ... | ... | ... |

FIG.12

| SERIAL NUMBER | DOMAIN NAME | TLD | WHOIS SERVER NAME | NS SERVER | DOMAIN NAME REGISTRATION DATE | DOMAIN NAME UPDATE DATE | DOMAIN NAME EXPIRATION DATE | ... |
|---|---|---|---|---|---|---|---|---|
| 1 | www.example.com | .com | whois.example.com | ns1.example.com | 2001.1.1 | 2014.1.1 | 2015.1.1 | ... |
| 2 | foo.example.com | .com | whois.example.com | ns2.example.com | 2001.1.1 | 2014.1.1 | 2015.1.1 | ... |
| 3 | example.com | .com | whois.example.com | ns3.example.com | 2001.1.1 | 2014.1.1 | 2015.1.1 | ... |
| ... | ... | ... | ... | ... | ... | ... | ... | ... |
| 101 | www.example.net | .net | whois.example.net | ns1.example.net | 2005.2.1 | 2015.1.1 | 2015.2.1 | ... |
| 102 | bar.example.net | .net | whois.example.net | ns2.example.net | 2005.2.1 | 2015.1.1 | 2015.2.1 | ... |
| 103 | hoge.example.net | .net | whois.example.net | ns3.example.net | 2005.2.1 | 2015.1.1 | 2015.2.1 | ... |
| 104 | example.net | .net | whois.example.net | ns3.example.net | ... | ... | ... | ... |
| ... | ... | ... | ... | ... | ... | ... | ... | ... |

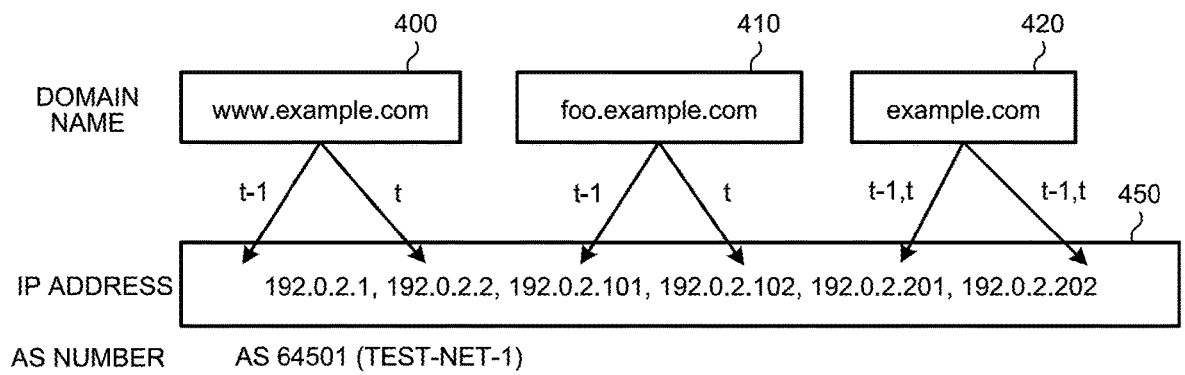

| SERIAL NUMBER | COMMUNICATION PARTNER | DOMAIN NAME GROUP RELEVANT TO COMMUNICATION PARTNER |
|---|---|---|
| 1 | www.example.com | www.example.com, foo.example.com, example.com |
| 2 | foo.example.com | www.example.com, foo.example.com, example.com |
| 3 | example.com | www.example.com, foo.example.com, example.com |
| ... | ... | ... |
| 101 | www.example.net | www.example.net, bar.example.net, hoge.example.net, example.net |
| 102 | bar.example.net | www.example.net, bar.example.net, hoge.example.net, example.net |
| 103 | hoge.example.net | www.example.net, bar.example.net, hoge.example.net, example.net |
| 104 | example.net | www.example.net, bar.example.net, hoge.example.net, example.net |
| ... | ... | ... |

FIG.15

| SERIAL NUMBER | COMMUNICATION PARTNER | CHARACTERISTIC INFORMATION | | | | | | | |
|---|---|---|---|---|---|---|---|---|---|
| | | NUMBER OF RELEVANT DOMAINS | DOMAIN NAME AVERAGE | DOMAIN NAME MEDIAN | DOMAIN NAME STANDARD DEVIATION | NUMBER OF TDLS | NUMBER OF WHOIS SERVERS | NUMBER OF NS SERVERS | ... |
| 1 | www.example.com | 3 | 13.7 | 15 | 2.31 | 1 | 1 | 3 | ... |
| 2 | foo.example.com | 3 | 13.7 | 15 | 2.31 | 1 | 1 | 3 | ... |
| 3 | example.com | 3 | 13.7 | 15 | 2.31 | 1 | 1 | 3 | ... |
| ... | ... | ... | ... | ... | ... | ... | ... | ... | ... |
| 101 | www.example.net | 4 | 14.3 | 15 | 2.22 | 1 | 1 | 4 | ... |
| 102 | bar.example.net | 4 | 14.3 | 15 | 2.22 | 1 | 1 | 4 | ... |
| 103 | hoge.example.net | 4 | 14.3 | 15 | 2.22 | 1 | 1 | 4 | ... |
| 104 | example.net | 4 | 14.3 | 15 | 2.22 | 1 | 1 | 4 | ... |
| ... | ... | ... | ... | ... | ... | ... | ... | ... | ... |

FIG.16

| SERIAL NUMBER | COMMUNICATION PARTNER | MALIGNANCY |
|---|---|---|
| 1 | www.example.com | 0.3 |
| 2 | foo.example.com | 0.4 |
| 3 | example.com | 0.2 |
| ... | ... | ... |
| 101 | www.example.net | 0.6 |
| 102 | bar.example.net | 0.7 |
| 103 | hoge.example.net | 0.9 |
| 104 | example.net | 0.7 |
| ... | ... | ... |

FIG.17

| SERIAL NUMBER | COMMUNICATION PARTNER | CHARACTERISTIC INFORMATION | | | | |
|---|---|---|---|---|---|---|
| | | BENIGN COMMUNICATION PARTNER LIST 1 | MALIGNANT COMMUNICATION PARTNER LIST 2 | ... | NUMBER OF RELEVANT DOMAINS | DOMAIN NAME AVERAGE | ... |
| 1 | www.example.co.jp | STABLY LISTED | LISTING ENDED HALFWAY | ... | 5 | 17 | ... |
| 2 | hoge.example.co.jp | STABLY LISTED | STABLY LISTED | ... | 5 | 17 | ... |
| ... | ... | ... | ... | ... | ... | ... | ... |

FIG.18

| SERIAL NUMBER | COMMUNICATION PARTNER | MALIGNANCY |
|---|---|---|
| 1 | www.example.co.jp | 0.2 |
| 2 | hoge.example.co.jp | 0.5 |

COMMUNICATION PARTNER MALIGNANCY CALCULATION DEVICE, COMMUNICATION PARTNER MALIGNANCY CALCULATION METHOD, AND COMMUNICATION PARTNER MALIGNANCY CALCULATION PROGRAM

FIELD

The present invention relates to a communication partner malignancy calculation device, a communication partner malignancy calculation method, and a communication partner malignancy calculation program.

BACKGROUND

With the wide use of the Internet, cyberattacks including DDoS attacks and transmission, of spam mails are surging. Most of these attacks result from malicious software called malware. Attackers infect terminals and servers of general users with malware, control the terminals and servers unauthorizedly by operating the malware, and implement information collecting and new attacks. These attacks have been a social problem in recent years. For this reason, measures against cyberattacks based on malware infection are urgently needed.

Measures implemented in terminals and measures implemented in networks are used as measures against cyberattacks. Methods using anti-virus software and methods using a host-based IDS (Instruction Detection System) or a host-based IPS (Instruction Prevention System) are used as measures implemented in terminals. In these methods, software is installed in terminals to implement measures.

On the other hand, methods using a network-based IDS or a network-based IPS, a FW (Firewall) or a WAF (web Application Firewall) are used as measures implemented in networks. In these methods, an examination device is arranged on a communication path in a network. For example, a method of examining communication of DNS queries and DNS responses at a site on the communication path in the network where communication with a DNS server can be monitored has been proposed (for example, see Non Patent Literature 1 or 2). Furthermore, in recent years, SIEM (Security Information and Event Management) services in which logs of terminals and devices are analyzed to find traces of attacks, etc., have been implemented.

In those methods, communication partners of and the communication content of malware infection attacks and other cyberattacks are collected in a decoy system referred to as honey pot. Furthermore, information about communications relevant to attacks is collected in a way that, by using a malware analysis system referred as a sandbox, malware is caused to run actually and partners and the content of communications by malware are collected and in a way that partners and the content of communications that are determined as attacks by a spam mail countermeasure system or a DDoS countermeasure system are collected.

For example, the IP addresses of the communication partners with respect to the collected attacks are blacklisted and communications with the IP addresses are determined as attacks. The information to be blacklisted may be uniform resource locators (URLs) or domain names. In this case, URLs or domain names may be blacklisted by regular expressions.

In general, when traffic logs and alerts are collected from different devices and software and information about communication partners and the content of communication are extracted, notations of items may foe different depending on devices and software. In recent years, a technology of converting sets of log information represented by different notations into a uniform notation for tallying has been widely used as SIEM products.

CITATION LIST

Patent Literature

Non Patent Literature 1: Antonakakis, et al., "Building a Dynamic Reputation System for DNS," Proc. USENIX conference on Security, 2010.
Non Patent Literature 2: L. Bilge, et al., "EXPOSURE: Finding Malicious Domains Using Passive DNS Analysis," Proc. NDSS, 2011.

SUMMARY

Technical Problem

The above-described method however does not enable extraction of all used malignant communication partners when information about communication relevant to cyberattacks is collected by using, for example, a honey pot or a sandbox. For example, there are numerous communication partners that are malignant sites collectable by a honey pot and the malignant sites become invalid and transition to other communication partners occur over time.

When malware is analyzed by a sandbox, the malware causes accesses to benign communication partners and accesses to malignant communication, partners that vary over time in order to hinder the analysis and check, connection to the Internet. As described above, only collecting information about communications relevant to cyberattacks has difficulty in exhaustively and accurately specifying malignant communication partners and blacklisting the malignant communication partners.

For example, Non Patent Literature 1 or 2 proposes a method of using information collected until a certain time point to blacklist malignant communication partners that are unspecified at the time point; however, there is a problem in that it is not possible to specify malignant communication partners that are temporarily used by attackers or malignant communication partners kept by attackers for preparing for attacks.

For this reason, currently, malignant communication partners used for attacks are not necessarily specified even when the latest black list is referred to at a certain time point to find cyberattacks and, in such a case, an analyzer has to analyze the content manually. This results in need for time costs and human costs for extracting information about communication partners used for attacks and these costs have been a significant bottleneck of security venders and service providers in recent years where there are a variety of attacks.

An objective of the present invention is to automatically calculate malignancy of a communication partner without causing any actual communication and accurately specify a malignant communication partner that cannot be determined by only referring to the latest blacklist.

Solution to Problem

To solve a problem and to achieve an object, a communication partner malignancy calculation device includes: a subject communication partner input unit to which a subject communication partner whose malignancy is to be calculated is input; a known communication partner input unit to which a communication partner known to be malignant and a communication partner known to be benign are input as known communication partners; a characteristic extractor that acquires whether the known communication partners and the subject communication partner are listed on a list for evaluating communication partners at a given time point and extracts changes over time in whether listed as characteristic information about the known communication partners and the subject communication partner; and a malignancy calculator that calculates malignancy of the subject communication partner on the basis of the characteristic information about the known communication partners and the subject communication partner.

A communication partner malignancy calculation method includes: at subject communication partner inputting step of inputting a subject communication partner whose malignancy is to be calculated; a known communication partner inputting step of inputting a communication partner known to foe malignant and, a communication partner known to be benign are input as known communication partners; a characteristic extracting step of acquiring whether the known communication partners and the subject communication partner are listed on a list for evaluating communication partners at a given time point and extracting changes over time in whether listed as characteristic information about the known communication partners and the subject communication partner; and a malignancy calculating step of calculating malignancy of the subject communication partner on the basis of the characteristic information about the known communication partners and the subject communication partner.

A communication partner malignancy calculation program causes a computer to execute: a subject communication partner inputting step of inputting a subject communication partner whose malignancy is to be calculated;

a known communication partner inputting step of inputting a communication partner known to be malignant and a communication partner known to be benign are input as known communication partners; a characteristic extracting step of acquiring whether the known communication partners and the subject communication partner are listed on a list for evaluating communication partners at a given time point and extracting changes over time in whether listed as characteristic information about the known communication partners and the subject communication partner; and a malignancy calculating step of calculating malignancy of the subject communication partner on the basis of the characteristic information about the known communication partners and the subject communication partner.

Advantageous Effects of Invention

According to the present invention, it is possible to automatically calculate malignancy of a communication partner without causing any real communication and accurately specify a malignant communication partner that cannot be determined by only referring to the latest blacklist.

BRIEF DESCRIPTION OF DRAWINGS

FIG. 2 is a table illustrating exemplary subject communication partners in a communication partner malignancy calculation device according to the first embodiment.

FIG. 3 is a table illustrating exemplary known communication partners in the communication partner malignancy calculation device according to the first embodiment.

FIG. 4 is a table illustrating exemplary evaluation information about communication partners in the communication partner malignancy calculation device according to the first embodiment.

FIG. 5 is a table illustrating exemplary evaluation information about communication partners in the communication partner malignancy calculation device according to the first embodiment.

FIG. 6 is a table illustrating exemplary evaluation information about communication partners in the communication partner malignancy calculation device according to the first embodiment.

FIG. 7 is a table illustrating exemplary correspondence relationships each between communication partners in the communication partner malignancy calculation device according to the first embodiment.

FIG. 8 is a table illustrating exemplary external information about IP addresses in the communication partner malignancy calculation device according to the first embodiment.

FIG. 11 is a table illustrating exemplary characteristic information that is extracted from IP address groups each relevant to a domain name in the communication partner malignancy calculation device according to the first embodiment.

FIG. 12 is a table illustrating exemplary external information about domain names in the communication partner malignancy calculation device according to the first embodiment.

FIG. 13 is a diagram illustrating an exemplary method of extracting a domain name group relevant to a domain name in the communication partner malignancy calculation device according to the first embodiment.

FIG. 14 is a table illustrating an exemplary list of domain name groups each relevant to a domain name in the communication partner malignancy calculation device according to the first embodiment.

FIG. 15 is a table illustrating exemplary characteristic information that is extracted from domain name groups each relevant to a domain name in the communication partner malignancy calculation device according to the first embodiment.

FIG. 16 is a table illustrating exemplary malignancy calculated by the communication partner malignancy calculation device according to the first embodiment.

FIG. 17 is a table illustrating exemplary integrated characteristic information in the communication partner malignancy calculation device according to the first embodiment.

FIG. 18 is a table illustrating exemplary malignancy calculated by the communication partner malignancy calculation device according to the first embodiment.

DESCRIPTION OF EMBODIMENTS

Embodiments of the communication partner malignancy calculation device, the communication partner malignancy calculation method, and the communication partner malignancy calculation program according to the present invention will be described in detail below with reference to the accompanying drawings. The embodiments do not limit the invention.

Figure 1:
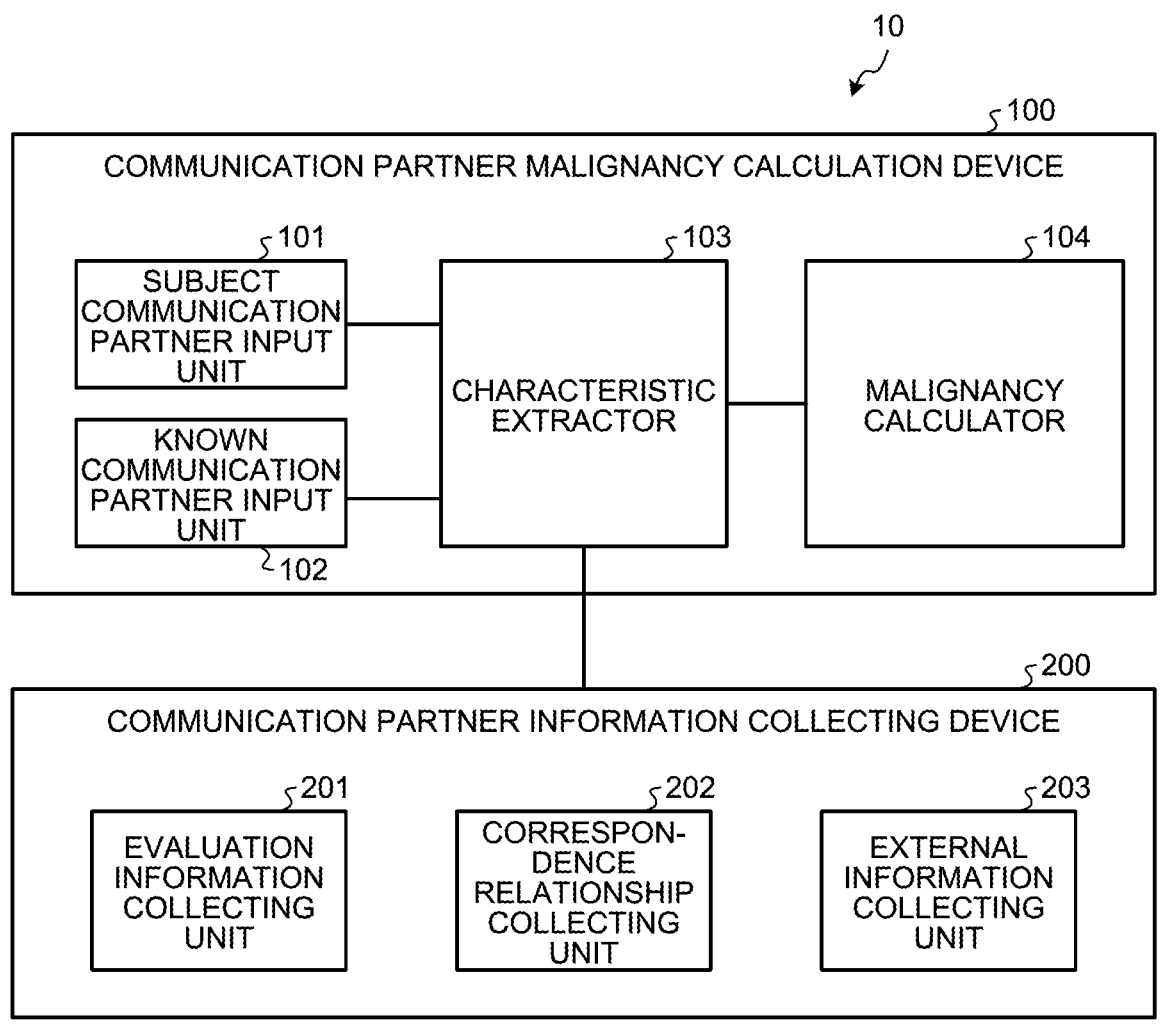
FIG. 1 is a diagram illustrating an exemplary configuration of a communication partner malignancy calculation system according to a first embodiment.

Configuration of Communication Partner Malignancy Calculation Device According to First Embodiment First of all, with reference to FIG. 1, a configuration of the communication partner malignancy calculation system will be described. FIG. 1 is a diagram illustrating an exemplary configuration of a communication partner malignancy calculation system according to a first embodiment. As illustrated in FIG. 1, a communication partner malignancy calculation system 10 includes a communication partner malignancy calculation device 100 and a communication partner information collecting device 200.

As illustrated in FIG. 1, the communication partner malignancy calculation device 100 includes a subject communication partner input unit 101, a known communication partner input unit 102, a characteristic extractor 103, and a malignancy calculator 104.

A subject communication partner that is a subject whose malignancy is calculated is input to the subject communication partner input unit 101. Exemplary data to be input to the subject communication partner input unit 101 will be described with reference to FIG. 2. FIG. 2 is a table illustrating exemplary subject communication partners in the communication partner malignancy calculation device according to the first embodiment. As illustrated in FIG. 2, the domain name, the URL, and the IP address, etc., are presented as the types of communication partners. For example, the row of Serial number 1 in FIG. 2 represents the communication partner whose domain name is "www.example.com". The types of communication partners are not limited to those illustrated in the drawing, and the FQDN (Fully Qualified Domain Name), etc., may be used. Evaluation information and external information need not be contained at this point as information about a communication partner to be input to the subject communication partner input unit 101.

Communication partners known to be malignant and communication partners known to be benign are input as known communication partners to the known communication partner input unit 102. Exemplary data to be input to the known communication partner input unit 102 will be described with reference to FIG. 3. FIG. 3 is a table illustrating exemplary known communication partners in the communication partner malignancy calculation device according to the first embodiment. First of all, as in the case of subject communication partners represented in FIG. 2, types of communication and communication partners are contained as the data on known communication partners. Furthermore, information indicating malignancy or benignity like that represented in the label column in FIG. 3 is also necessary. For example, the row of Serial Number 1 in FIG. 3 represents that the label of the communication partner whose domain name is "foo.example.com" represents "benignity". In the example in FIG. 3, the information represented in the label column consists of binaries representing malignancy and benignity; however, the information is not limited to that illustrated in FIG. 3, and a value indicating malignancy may be used. As in the case of FIG. 2, the types of communication partner are not limited to those illustrated in the drawing.

The characteristic extractor 103 acquires whether known communication partners and the subject communication partner are listed at a given time point on a list for evaluating communication partners and extracts changes over time in whether listed as characteristic information about the known communication partners and the subject communication partner. The characteristic extractor 103 farther acquires external information about the known communication partners and the subject communication partner and correspondence relationships with relevant communication partners and further extracts, as characteristic information, statistics of external information about a relevant communication partner group extracted from the correspondence relationships. Descriptions of the specific process in the characteristic extractor 103 will be given below together with the descriptions of the information collected by the communication partner information collecting device 200.

The characteristic extractor 103 may acquire whether listed, which is collected in a given period in a given cycle, from the list for evaluating communication partners. The known communication partners and the subject communication partner may be domain names. The relevant communication partners may be IP addresses associated with the known communication partners and the subject communication partner, with the top level domains of the known communication partners and the subject communication partner, and with the domain names having the known communication partners and the subject communication partner as the top level domains or may be domain names having logs indicating that the domain names are associated with IP addresses that belong to the same AS number as that of the known communication partners and the subject communication partner.

The malignancy calculator 104 calculates malignancy of the subject communication partner on the basis of the characteristic information about the known communication partners and the subject communication partner. The malignancy calculator 104 may generate a model for calculating malignancy by supervised machine learning, where the characteristic information about the known communication partners is input data and whether the known communication partners are malignant or benign is output data, and may calculate malignancy of the subject communication partner by using the model.

As illustrated in FIG. 1, the communication partner information collecting device 200 includes an evaluation information collecting unit 201, a correspondence relationship collecting unit 202, and an external information collecting unit 203. The information collected by each unit of the communication partner information collecting device 200 is transferred to the characteristic extractor 103 of the communication partner malignancy calculation device 100.

The evaluation information collecting unit 201 collects evaluation information about a communication partner. The evaluation information collecting unit 201 collects a malignant, communication partner list, a benign communication partner list that are defined in advance, etc., as evaluation information about the communication partner. The evaluation information may be collected in a given period and in a given cycle that are pre-set. For example, a known Web crawling method is used as a collecting method to access a destination to which the list to be collected is distributed. The list to be collected is not limited to that like the above-described malignant communication partner list or the benign communication partner list representing malignancy or benignity. For example, it is satisfactory if the list be one like a list of communication partners accessed a lot, which are communication partners evaluated in some way and constantly started or ended to be listed.

With reference to FIG. 4, the evaluation information collected by the evaluation information collecting unit 201 will be described. FIG. 4 is a table illustrating exemplary evaluation information about communication partners in the communication partner malignancy calculation device according to the first embodiment. As illustrated in FIG. 4, the evaluation information collecting unit 201 collects multiple malignant communication partner lists and benign communication partner lists and uses the listing status in a given period on each of the lists as evaluation information. In the table in FIG. 4, for example, t, t-1 and t-2 indicate the current month, the last month and the month before last, where whether there is the listing on the lists in each of the periods is represented.

For example, the row of Serial Number 1 in FIG. 4 represents that the communication partner "www.example.com" is listed on a "malignant communication partner list 1" from a time point t-2 until a time point t. The row of Serial Number 2 represents that the communication partner "www.example.com" is not listed on a "benign communication list 2" at the time point t-2 and is listed on the "benign communication list 2" at a time point t-1 and the time point t.

The evaluation information collecting unit 201 may use all or part of an open blacklist as the malignant communication partner list. The evaluation information collecting unit 201 may use, as the benign communication partner list, all or part of a list of popular domains browsed frequently like ones open on the web or a list of domains that are frequently browsed and that can be collected in a given network.

The evaluation information collecting unit 201 may determine that each communication partner is listed on the list not only when the communication partner completely matches a communication partner listed on the list but also when the communication partner partly matches a communication partner listed on the list or when similarity of the communication partner, which is set separately, satisfies certain standards.

The characteristic extractor 103 extracts characteristic information like that illustrated in FIG. 5 or FIG. 6 on the basis of the table in FIG. 4. FIGS. 5 and 6 are tables illustrating exemplary evaluation information about communication partners in the communication partner malignancy calculation device according to the first embodiment.

FIG. 5 illustrates changes over time in whether communication partners are listed on each list, which are changes extracted as characteristic information. For example, the communication partner "www.example.com" represented in Serial Number 1 in FIG. 5 is stably listed on the benign communication partner list 1 at each time point in a range from t-2 to t and therefore the characteristic extractor 103 extracts characteristic information "stably listed". In the same manner, the characteristic extractor 103 is able to extract characteristic information "listing started halfway" when the listing starts halfway, the characteristic extractor 103 is able to extract characteristic information "listing ended halfway" when the listing ends halfway, and the characteristic extractor 103 is able to extract characteristic information "unlisted" when the communication partner is not listed at any time point. The method of extracting characteristic information is not limited to that illustrated in FIG. 5. For example, characteristic information may be numeric values and may be extracted according to a rule defining, for example, that only 1 should be added to the numeric value when the communication partner is listed.

FIG. 6 illustrates combined changes over time in whether a communication partner is listed on multiple lists. For example, with respect to the communication partner "www.example.com" represented in Serial Number 1 in FIG. 6, characteristic information "stably listed & listing started halfway" indicating that the communication partner is stably listed, on the benign communication partner list 1 at each time point in the range from t-2 to t and listing the communication partner on the benign communication partner list 2 is started halfway is extracted. The method of extracting characteristic information is not limited to that illustrated in FIG. 6. For example, the characteristic information may be represented by a sum or a product of values into which changes over time in whether a communication partner is listed are converted.

The correspondence relationship collecting unit 202 collects correspondence relationships each between different types of communication partners and the logs of the correspondence relationships. The correspondence relationship collecting unit 202 performs the collecting by using a method called Passive DNS for collecting DNS queries by a DNS server. With reference to FIG. 7, the Correspondence relationships collected by the correspondence relationship collecting unit 202 and the logs of the correspondence relationships will be described. FIG. 7 is a table illustrating exemplary correspondence relationships each between communication partners in the communication partner malignancy calculation device according to the first embodiment.

FIG. 7 illustrates exemplary correspondence relationships each between a domain name and an IP address and logs of the correspondence relationships. It is possible to acquire a correspondence relationship between a domain name and an IP address by using a protocol represented, by, for example, DNS. A correspondence relationship between s domain name and an IP address may vary over time according to the management or the mode of management. Thus, the correspondence relationship collecting unit 202 assigns timestamps to the correspondence relationships each between a domain name and an IP address and acquires the time stamps as logs.

For example, the row of Serial Number 1 in FIG. 7 indicates that the IP address "192.0.2.1" corresponds to the domain name "www.example.com" at 2015-01-01 00:00:00. The row of Serial Number 2 represents that the IP address "192.0.2.2" corresponds to the domain name "www.example.com" at 2015-01-01 01:00:00 one hour after that in the row of Serial Number 1. The row of Serial Number 201 represents that sound robin DNS that is a known load distribution technology, or the like, is used and the multiple IP addresses "192.0.2.201, 192.0.2.202" correspond to the domain name "example.com" at 2015-01-01 00:00:00.

To collect logs of correspondence relationships each between a domain name and an IP address, the correspondence relationship collecting unit 202 is able to use a method of observing DNS communications by using an authorized DNS server that manages top level domains and second level domains or a cache DNS server that is arranged in a given network in an organization.

The external information collecting unit 203 collects external information indicating the management status or use status of a communication partner, etc. With reference to FIG. 8, exemplary external information about IP addresses that is collected by the external information collecting unit 203 will be described. FIG. 8 is a table illustrating exemplary external information about IP addresses in the communication partner malignancy calculation device according to the first embodiment.

As illustrated in FIG. 8, an address prefix and an AS number to which an IP address belongs, an organization name, a country, a regional Internet registry (RIR), and an address assignment date at which the address is assigned from the RIR are taken as external information of IP address. The external information corresponding to IP addresses is not limited to that illustrated in FIG. 8. Furthermore, the external information collecting unit 203 is able to collect external information about IP addresses by using information uniquely collected by using a WHOIS protocol, information opened by each RIR, and information obtained by using open services, such as Geo IP (trademark) from MaxMind.

For example, the row of Serial Number 1 in FIG. 8 represents that the address prefix that is the external information of the IP address "192.0.2.1" is "192.0.2.0/24", the AS number is "64501", the organization name is "TEST-NET-1", the country is "US", the RIR is "ARIN", and the address assignment date is "Jan/01/2001".

Figures 9, 10:
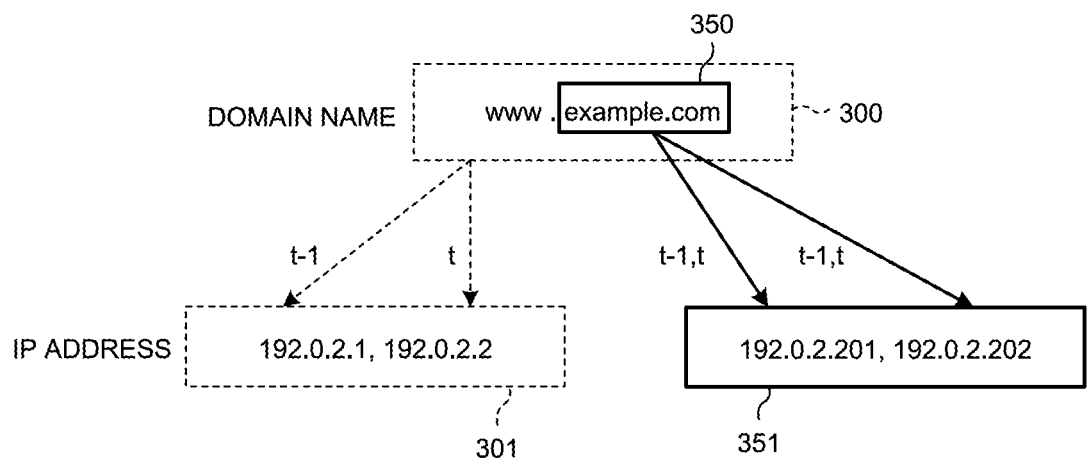
FIG. 9 is a diagram illustrating an exemplary method of extracting an IP address group relevant to a domain name in the communication partner malignancy calculation device according to the first embodiment.
FIG. 10 is a table illustrating an exemplary list of IP address groups each relevant to a domain name in the communication partner malignancy calculation device according to the first embodiment.

With reference to FIGS. 9, 10 and 11, the exemplary case where the characteristic extractor 103 extracts characteristic information from the correspondence relations-hip between a domain name and an IP address and the log of the correspondence relationship and the external information about the IP address illustrated in FIG. 8 will be described. First of all, the characteristic extractor 103 extracts an IP address group relevant to the domain name by using the method illustrated in FIG. 9. FIG. 9 is a diagram illustrating an exemplary method of extracting an IP address group relevant to a domain name in the communication partner malignancy calculation device according to the first embodiment.

With reference FIG. 9, the method of extracting an IP address group relevant to a domain name 300 will be described. As illustrated in FIG. 7, the domain name 300 corresponds to the IP address "192.0.2.1" at t-1 that is 2015-01-01 00:00:00 and corresponds to the IP address "192.0.2.2" at t that is 2015-01-01 01:00:00. Furthermore a domain name 350 that is a top level domain corresponds to the IP addresses "192.0.2.201" and "192.0.2.202" at t-1 that is 2015-01-01 00:00:00 and corresponds to the IP addresses "192.0.2.201" and "192.0.2.202" also at t that is 2015-01-01 01:00:00. Accordingly, the four IP addresses "192.0.2.1", "192.0.2.2", "192.0.2.201" and "192.0.2.202" contained in the IP address groups 301 and 351 are extracted as IP address groups relevant to the domain name 300.

In this manner, it is possible to extract a list of IP address groups relevant to each domain name as illustrated in FIG. 10. FIG. 10 is a table illustrating an exemplary list of IP address groups each relevant to a domain name in the communication partner malignancy calculation device according to the first embodiment. For example, the IP address group relevant to the domain name "www.example.com" represented by Serial Number 1 consists of the four IP addresses "192.0.2.1", "192.0.2.2", "192.0.2.201" and "192.0.2.202".

The characteristic extractor 103 extracts, as the amount of characteristic, calculated statistics like those represented in FIG. 11 from the external information about the IP addresses contained in the IP address group relevant to each domain name. FIG. 11 is a table illustrating exemplary characteristic information that is extracted from IF address groups each relevant to a domain name in the communication partner malignancy calculation device according to the first embodiment.

For example, the IP address group relevant to the domain name "www.example.com" written in the row of Serial Number 1 in FIG. 11 includes "192.0.2.1", "192.0.2.2", "192.0.2.201" and "192.0.2.202" and the characteristic extractor 103 refers to FIG. 8 to calculate, as characteristic information, the number of address prefixes, the number of AS numbers, the number of organization names, the number of counties, the number of RIRs, the number of days during which the address is assigned, etc., that are calculable statistics with respect to these IP addresses. For example, the row of Serial Number 1 in FIG. 11 represents that the relevant IP addresses calculated from the communication partner "www.example.com" is four, the number of address prefixes is one, the number of AS numbers is one, the number of organization names is one, the number of countries is one, the number of RIRs is one, and the number of days to which the address is assigned is one. The statistic items are not limited to those illustrated in FIG. 11.

The exemplary case where the characteristic extractor 103 extracts characteristic information about the basis of the external information about the relevant IP address group has been described. There is a method of extracting characteristic information on the basis of external information about a relevant domain name group as another method performed by the characteristic extractor 103 to extract the characteristic information. The characteristic extractor 103 may employ any one of or both the method of extracting characteristic information on the basis of the external information about an IP address group and the method of extracting characteristic information on the basis of external information about a relevant domain name group.

When the characteristic extractor 103 extracts characteristic information on the basis of external information about a relevant domain group, the external information collecting unit 203 collects external information about domain names. With reference to FIG. 12, exemplary external information about domain names that is collected by the external information collecting unit 203 will be described. FIG. 12 is a table illustrating exemplary external information about domain names in the communication partner malignancy calculation device according to the first embodiment.

As illustrated in FIG. 12, a TLD (top level domain) to which a domain name belongs, a WHOIS server name, a MS server, a domain name registration, date, a domain name update date, a domain name expiration date, etc., can be taken as external information about the domain name. The external information about domain names is not limited to that represented in FIG. 12. The external information collecting unit 203 is able to collect the external information about domain names by using information that is collected uniquely by using a WHOIS protocol or information obtained through services opened by a third party.

For example, the row of Serial Number 1 In FIG. 12 illustrates that the TLD that is the external information about the domain name "www.example.com" is ".com", the WHOIS server name is "whois.example.com", the MS server is "nsl.example.com", the domain name registration date is "2011.1.1", the domain name update date is "2014.1.1", and the domain name expiration date is "2015.1.1".

With reference to FIGS. 13, 14 and 15, an exemplary case where the characteristic extractor 103 extracts characteristic information from correspondence relationships each between a domain name and an IP address and logs of the correspondence relationships illustrated in FIG. 7 and the external information about domain names illustrated in FIG. 12. First of all, the characteristic extractor 103 extracts a domain name group relevant to a domain name by using the method illustrated in FIG. 13. FIG. 13 is a diagram illustrating an exemplary method of extracting a domain name group relevant to a domain name in the communication partner malignancy calculation device according to the first embodiment.

With reference to FIG. 13, the method of extracting a domain name group relevant to a domain name 400 will be described. As illustrated in FIG. 7, the domain name 400 corresponds to the IP address "192.0.2.1" at t1 that is 2015-01-01 00:00:00 and corresponds to the IP address "192.0.2.2" at t that is 2015-01-01 01:00:00. Then, domain names 410 and 420 having corresponded to an IP address group 450 containing the IP addresses "192.0.2.101" and "192.0.2.201" having the same AS number "64501" as that of "192.0.2.1" and "192.0.2.2" are extracted as a domain name group.

As described above, as illustrated in FIG. 14, it is possible to extract a list of relevant domain name groups with respect to each domain name. FIG. 14 is a table illustrating an exemplary list of domain name groups each relevant to a domain name in the communication partner malignancy calculation device according to the first embodiment. For example, it can be seen that the domain name group relevant to the domain name "www.example.com" represented by Serial Number 1 consists of the three domain names "www.example.com", "foo.example.com" and "example.com". For the convenience in calculating statistics, the domain name group relevant to a domain name contains the domain name.

The characteristic extractor 103 extracts, as an amount of characteristic, statistics like those illustrated in FIG. 15 from the external information about the domains contained in the domain group related to each of the domain names. FIG. 15 is a table illustrating exemplary characteristic information that is extracted from domain name groups each relevant to a domain name in the communication partner malignancy calculation device according to the first embodiment.

For example, the domain name group relevant to the domain name "www.example.com" written in the row of Serial Number 1 in FIG. 15 includes "www.example.com", "foo.example.com" and "example.com" and the characteristic extractor 103 refers to FIG. 12 to calculate the number of domain names, the number of TLDs, the number of WHOIS servers, the number of MS servers, etc., that are statistics calculable with respect to the domain names. The characteristic extractor 103 may calculate, as characteristic information, a domain name average, a domain name median, and a domain name standard deviation as statistics relating to the number of letters of the string of a relevant domain name. For example, the row of Serial Number 1 in FIG. 15 represents that the number of relevant domain names calculated from the communication partner "www.example.com" is 3, the domain name average is 13.7, the domain name median is 15, and the domain name standard deviation is 2.31, the number of TLDs is 1, the number of WHOIS servers is 1, and the number of MS servers is 3. The statistic items are not limited to those illustrated in FIG. 15.

The malignance calculator 104 calculates malignancy of each communication partner like that illustrated in FIG. 16. FIG. 16 is a table illustrating exemplary malignancy calculated by the communication partner malignancy calculation device according to the first embodiment. The row of Serial Number 1, for example, represents that the malignancy calculator 104 calculates malignancy of 0.3 with respect to "www.example.com" that is one of the communication partners, represented in FIG. 2, whose malignancy is to be calculated.

It is possible to use a known statistical analysis method of finding, for example, an outlier or a machine learning method represented by support vector machines, random forest, and logistic regression. Malignancy is not only calculated in continuous values but also, when calculated in discrete values, output after the malignancy is converted into a given value or a label according to the result of calculation in continuous values or discrete values, that is, the embodiments are not limited to that illustrated in FIG. 16.

Specifically, first of all, the malignancy calculator 104 generates a training model that is a model for calculating malignancy by applying a given algorithm to characteristic information about known communication partners like that illustrated in FIG. 3. The characteristic information includes, as illustrated above, one based on evaluation information like that illustrated in FIGS. 5 and 6 and one based on external information about a communication partner and correspondence relationships like those illustrated in FIGS. 11 and 15. The malignancy calculator 104 calculates malignancy by using the generated training model and by applying an algorithm used to generate the training model to a subject communication partner. The training model is generated such that a known communication partner labeled with a benignity label like that illustrated in FIG. 3 has low malignancy and a known communication partner labeled with a malignancy label has high malignancy. For example, when the given algorithm is logistic regression, a regression expression that reduces the malignancy of the communication partner "foo.example.com" and that increases the malignancy of the communication partner "bar.example.com" is obtained as the training model and thus it is possible to obtain malignancy of the subject communication partner from the obtained regression expression.

It is also possible to calculate, with respect to unknown, communication partners like those illustrated in FIG. 17, malignancy like that illustrated in FIG. 18 by collecting various types of information and extracting unified characteristic information. FIG. 17 is a table illustrating exemplary unified characteristic information in the communication partner malignancy calculation device according to the first embodiment. FIG. 18 is a table illustrating exemplary malignancy calculated by the communication partner malignancy calculation device according to the first embodiment.

Figure 19:
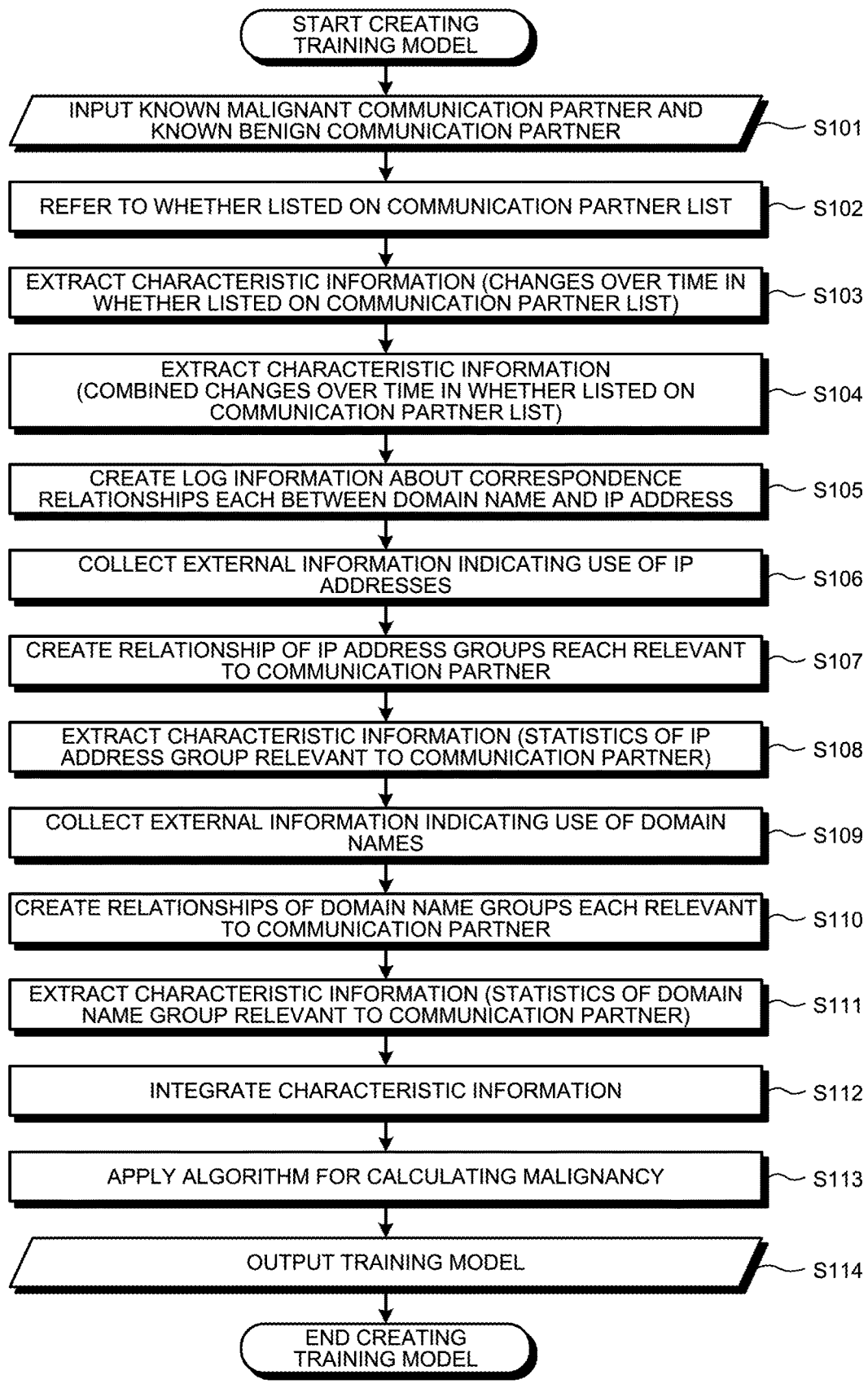
FIG. 19 is a chart illustrating an exemplary process performed by the communication partner malignancy calculation device according to the first embodiment.
Figure 20:
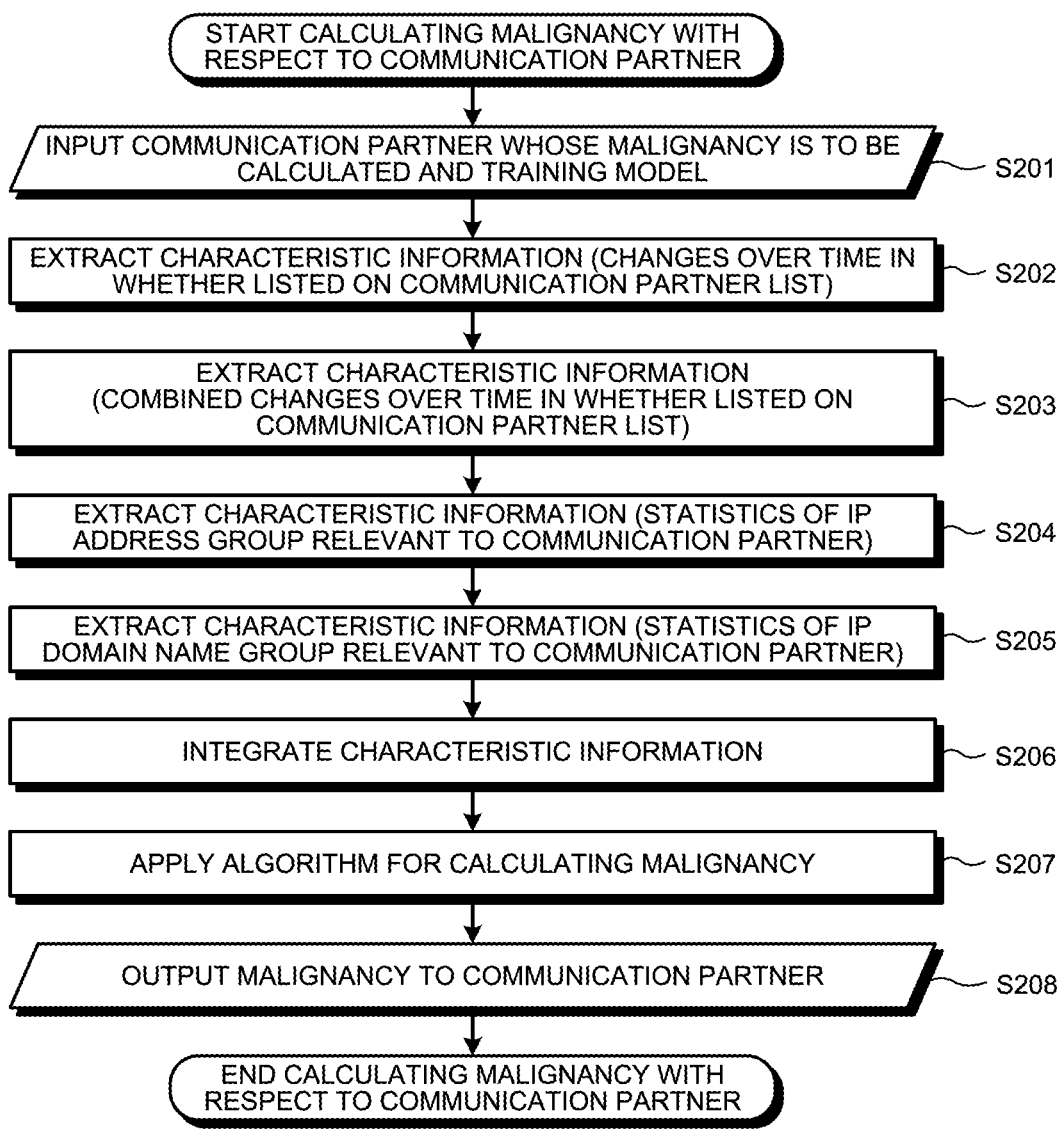
FIG. 20 is a chart illustrating an exemplary process performed by the communication partner malignancy calculation device according to the first embodiment.

Process Performed by Communication Partner Malignancy Calculation Device According to First Embodiment With reference to FIGS. 19 and 20, the process performed by the communication partner malignancy calculation device 100 will be described. FIGS. 19 and 20 are charts illustrating exemplary processes performed by the communication partner malignancy calculation device according to the first embodiment. Specifically, FIG. 19 illustrates the process until the above-described generation of a training model and FIG. 20 illustrates a process of calculating malignancy by using the generated training model.

With reference to FIG. 19, the process until generation of a training model will be described. As illustrated in FIG. 19, first of all, known malignant communication partners and known benign communication partners are input to the known communication partner input unit 102 (step S101). The characteristic extractor 103 then refers to whether the known malignant communication partners and known benign communication partners, which are input, are listed on communication partner lists (step S102). The characteristic extractor 103 then extracts, as characteristic information, changes over time in whether listed on the communication partner lists (step S103) and combined changes over time in whether listed on the communication partner lists (step S104).

The characteristic extractor 103 creates information of the logs of correspondence relationships each between a domain name and an IP address (step S105). Then, external information indicating the use of IP addresses is collected (step S106) and the characteristic extractor 103 creates relationships of IP address groups each relevant to a communication partner (step S107) and extracts statistics of the IP address group relevant to the communication partner as characteristic information (step S108).

External information indicating the use of domain names is collected (step S109) and the characteristic extractor 103 creates relationships of domain name groups each relevant to a communication partner (step S110) and statistics of the domain name group relevant to the communication partner are extracted as characteristic information (step S111).

The malignancy calculator 104 then integrates the extracted characteristic information (step S112), applies an algorithm for calculating malignancy (step S113), and outputs a training model (step S114).

With reference to FIG. 20, a process of calculating malignancy by using the training model will be described. As illustrated in FIG. 20, first of all, a communication partner whose malignancy is to be calculated and the training model are input to the subject communication partner input unit 101 (step S201). The characteristic extractor 103 then extracts changes over time in whether listed on the communication partner lists (step S202) and combined changes over time in whether listed on the communication partner lists (step S203).

The characteristic extractor 103 then extracts statistics of an IP address group relevant to the communication partner as characteristic information (step S204) and further extracts statistics of a domain name group relevant to the communication partner as characteristic information (step S205). The malignancy calculator 104 then integrates the sets of extracted characteristic information (step S206), applies the algorithm for calculating malignancy by using the training model (step S207), and outputs the malignancy with respect to the communication partner (step S208).

Effect of First Embodiment

The communication partner malignancy calculation device 100 inputs a subject communication partner whose malignancy is to be calculated to the subject communication partner input unit 101 and inputs a communication partner known to be malignant and a communication partner known to be benign to the known communication partner input unit 102 as known communication partners. The characteristic extractor 103 extracts, as characteristic information about the known communication partners and the subject communication partner, changes over time in whether the known communication partners and the subject communication partner are listed on a malignant communication partner list and a benign communication partner list at a given time point. The malignancy calculator 104 calculates malignancy of the subject communication partner on the basis of the characteristic information about the known communication partners and the subject communication partner. Accordingly, it is possible to automatically calculate malignancy of a communication partner without causing any real communication and accurately specify a malignant communication partner that cannot be determined by only referring to the latest blacklist.

The malignancy calculator 104 uses the characteristic information about the known communication partners as input data, generates a model for calculating malignancy by supervised machine learning where whether the known communication partners are malignant or benign is used as output data and calculates malignancy of the subject communication partner by using the generated model. Accordingly, for example, it is possible to automatically calculate malignancy of the subject communication partner accurately by only inputting the characteristic information of the subject communication partner to the model for which the changes over time in the known communication partners, etc., are taken into account.

Conventionally, communication partners whose malignancy is unknown includes a communication partner that is temporarily used by an attacker and a communication partner highly likely to be used by an attacker in the future and it is not possible to determine whether the communication partners are malignant by only referring to a blacklist. On the other hand, according to the first embodiment, the known malignant communication partner list and benign communication partner list are obtained, changes of each communication partner over time (such as start of listing or end of listing) analyzed and extracted as characteristic information, the characteristic information is compared for analysis with the characteristic information of a list of communication partners to be analyzed to calculate malignancy of each of the communication partners to be analyzed, and therefore it is possible to calculate malignancy of the communication partners whose malignancy is unknown without causing any real communication. Furthermore, the characteristic extractor 103 acquires whether listed, which is collected in a given cycle in a given period from the list for evaluating communication partners, and thus it is possible to efficiently compare the information of multiple lists.

The characteristic extractor 103 further acquires external information about the known communication partners and the subject communication partner and log information about correspondence relationships with relevant Communication partners and further extracts, as characteristic information, statistics of external information about a relevant communication partner group extracted from the information of the logs. The relevant communication partners are, for example, IP addresses associated with the top level domains of the communication partners and with the domain names having the communication partners as the top level domains or are domain names having IP addresses that belong to the same AS number.

Accordingly, it is possible to calculate malignancy of communication partners in a wide range covering, in addition to the subject communication partner and the known communication partners, communication partners relevant thereto and obtain much characteristic information, which enables improvement in accuracy of calculation.

The descriptions of the embodiment, describes the case where the process of generating a model and the process of calculating malignancy of a subject communication partner by using the generated model are performed independently; however, the present invention is not limited thereto. For example, no model may be generated, information about the known communication partners and information about the subject communication partner may be input at the same time, and the characteristic information about the known communication partners and the characteristic information about the subject communication partner may be compared and analyzed to calculate malignancy.

System Configuration

Each of the components of each of the devices illustrated in the drawings is a functional idea and therefore they need not necessarily be configured physically as illustrated in the drawings. In other words, specific modes of dispersion and integration of each device are not limited to those illustrated in the drawings. All or part of the each device may be configured in a distributed or integrated manner in a given unit according to various types of load and the use thereof. Furthermore, all or part of each processing function implemented by each processor may be implemented by a CPU (Central Processing Unit) and a program that is analyzed and executed by the CPU or may be implemented as hardware using a wired logic.

All or part of each process described in the embodiment as one performed automatically may be performed manually or all or part of each described as one performed manually may be performed automatically by using a known method. Furthermore, the process procedures, control procedures, specific names, information containing various types of data and parameters described in the document and drawings may be changed freely unless otherwise denoted.

Program

A program written in a computer-executable language may be created for the processes executed by the communication partner malignancy calculation device described in the above-described embodiment. In this case, a computer executes the program and accordingly the same effect as that of the embodiment can be achieved. Furthermore, the program may be recorded in a computer-readable recording medium and the program stored in the recording medium may be read and executed by the computer to realize the same processes as those of the above-described embodiment. An exemplary computer that executes a program that implements the same functions as those of the communication partner malignancy calculation device illustrated in FIG. 1 will be described.

Figure 21:
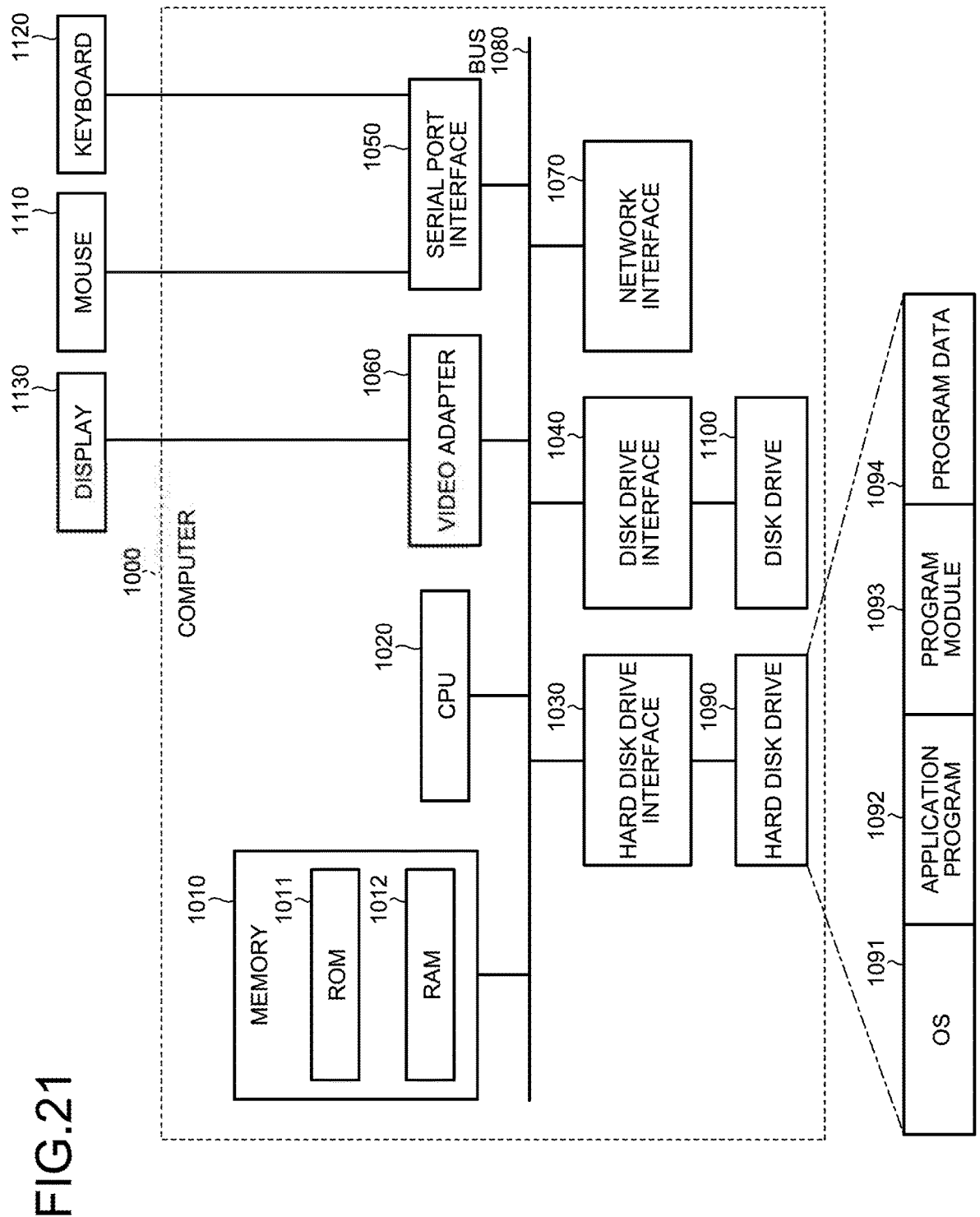
FIG. 21 is a diagram illustrating an exemplary computer that functions as the communication partner malignancy calculation device.

FIG. 21 is a diagram of an exemplary computer that functions as the communication partner malignancy calculation device. As exemplified in FIG. 21, a computer 1000 includes, for example, a memory 1010, a CPU 1020, a hard disk drive interface 1030, a disk drive interface 1040, a serial port interface 1050, a video adapter 1060, and a network interface 1070 that are connected via a bus 1080.

As exemplified in FIG. 21, the memory 1010 includes a ROM (Read Only Memory) 1011 and a RAM (Random Access Memory) 1012. The ROM 1011 stores, for example, a boot program, such as a BIOS (Basic Input Output System), The hard disk drive interface 1030 is connected to a hard disk drive 1090 as exemplified in FIG. 21. The disk drive interface 1040 is connected to a disk drive 1100 as exemplified in FIG. 21. For example, a detachable storage medium, such as a magnetic disk or an optical disk, is inserted into the disk drive 1100. The serial port interface 1050 is connected to, for example, a mouse 1110 and a keyboard 1120 as exemplified in FIG. 21. The video adapter 1060 is connected to, for example, a display 1130 as exemplified in FIG. 21.

As exemplified in FIG. 21, the hard disk drive 1090 stores, for example, an OS 1091, an application program 1092, a program module 1093, and program data 1094. In other words, the program is stored in, for example, the hard disk drive 1090 as a program module in which commands to be executed by the computer 1000 are written.

Furthermore, the various types of data described in the above-described embodiment are stored as program data in, for example, the memory 1010 or the hard disk drive 1090. The CPU 1020 reads the program module 1093 and the program data 1094, which are stored in the memory 1010 or the hard disk drive 1090, into the RAM 1012 and executes them as required.

Storing the program module 1093 and the program data 1094 according to the program is not limited to storing them in the hard disk drive 1090. They may be stored in, for example, a detachable storage medium and may be read by the CPU 1020 via the disk drive 1100, or the like. Alternatively, the program module 1093 and the program data 1094 according to the program may be stored in another computer that is connected via a network (such as a LAN (Local Area Network) or a WAN (Wide Area Network) and may be read by the CPU 1020 via the network interface 1070.

REFERENCE SIGNS LIST

10 COMMUNICATION PARTNER MALIGNANCY CALCULATION SYSTEM
100 COMMUNICATION PARTNER MALIGNANCY CALCULATION DEVICE
101 SUBJECT COMMUNICATION PARTNER INPUT UNIT
102 KNOWN COMMUNICATION PARTNER INPUT UNIT
103 CHARACTERISTIC EXTRACTOR
104 MALIGNANCY CALCULATOR
200 COMMUNICATION PARTNER INFORMATION COLLECTING DEVICE
201 EVALUATION INFORMATION COLLECTING UNIT
202 CORRESPONDENCE RELATIONSHIP COLLECTING UNIT
203 EXTERNAL INFORMATION COLLECTING UNIT

The invention claimed is:

1. A communication partner malignancy calculation device comprising:
processing circuitry configured to:
receive an input of a subject communication partner whose malignancy is to be calculated;
receive an input of a communication partner known to be malignant and a communication partner known to be benign as known communication partners;
acquire whether the known communication partners and the subject communication partner are listed on a list for evaluating communication partners at a given time point and extract changes over time, regarding whether the known communication partners and the subject communication partner are listed, as characteristic information about the known communication partners and the subject communication partner, wherein the characteristic information indicating when the known communication partners and the subject communication partner were added to the list, when the known communication partners and the subject communication partner were removed from the list, and when the known communication partners and the subject communication partner were stably on the list over a plurality of time points in a range of time;
generate a model for calculating malignancy by supervised machine learning, where the characteristic information about the known communication partners is input data and whether the known communication partners are malignant or benign is output data;
calculate malignancy of the subject communication partner on the basis of the model and the characteristic information about the subject communication partner, wherein the characteristic information about the subject communication partner includes statistics of an Internet Protocol (IP) address group relevant to the communication partner and statistics of an IP domain name group relevant to the communication partner;
output the calculated malignancy as a value that indicates a degree of malignancy; and
add the subject communication partner to a blacklist based on the value,
wherein the processing circuitry is configured to further acquire external information about the known communication partners and the subject communication partner and log information about correspondence relationships each between domain name and IP address and further extract, as the characteristic information, statistics of the external information about a relevant communication partner group extracted from the log information, and
the known communication partners and the subject communication partner are domain names.

2. The communication partner malignancy calculation device according to claim 1, wherein
the relevant communication partners may be IP addresses associated with the known communication partners and the subject communication partner, with top level domains of the known communication partners and the subject communication partner, and with the domain names having the known communication partners and the subject communication partner as top level domains.

3. The communication partner malignancy calculation device according to claim 1, wherein
the relevant communication partners may be domain names having logs indicating that the domain names are associated with IP addresses that belong to the same autonomous system (AS) number as that of the known communication partners and the subject communication partner.

4. A communication partner malignancy calculation method comprising:
inputting a subject communication partner whose malignancy is to be calculated;
inputting a communication partner known to be malignant and a communication partner known to be benign are input as known communication partners;
acquiring whether the known communication partners and the subject communication partner are listed on a list for evaluating communication partners at a given time point and extracting changes over time, regarding whether the known communication partners and the subject communication partner are listed, as characteristic information about the known communication partners and the subject communication partner, wherein the characteristic information indicating when the known communication partners and the subject communication partner were added to the list, when the known communication partners and the subject communication partner were removed from the list, and when the known communication partners and the subject communication partner were stably on the list over a plurality of time points in a range of time;
generating a model for calculating malignancy by supervised machine learning, where the characteristic information about the known communication partners is input data and whether the known communication partners are malignant or benign is output data;
calculating malignancy of the subject communication partner on the basis of the model and the characteristic information about the subject communication partner, wherein the characteristic information about the subject communication partner includes statistics of an Internet Protocol (IP) address group relevant to the communication partner and statistics of an IP domain name group relevant to the communication partner;
outputting the calculated malignancy as a value that indicates a degree of malignancy; and
adding the subject communication partner to a blacklist based on the value,
wherein the method further includes acquiring external information about the known communication partners and the subject communication partner and log information about correspondence relationships each between domain name and IP address and further extract, as the characteristic information, statistics of the external information about a relevant communication partner group extracted from the log information, and
the known communication partners and the subject communication partner are domain names.

5. A non-transitory computer-readable recording medium having stored a communication partner malignancy calculation program that causes a computer to execute a process comprising:
inputting a subject communication partner whose malignancy is to be calculated;
inputting a communication partner known to be malignant and a communication partner known to be benign are input as known communication partners;
acquiring whether the known communication partners and the subject communication partner are listed on a list for evaluating communication partners at a given time point and extracting changes over time, regarding whether the known communication partners and the subject communication partner are listed, as characteristic information about the known communication partners and the subject communication partner, wherein the characteristic information indicating when the known communication partners and the subject communication partner were added to the list, when the known communication partners and the subject communication partner were removed from the list, and when the known communication partners and the subject communication partner were stably on the list over a plurality of time points in a range of time;
generating a model for calculating malignancy by supervised machine learning, where the characteristic information about the known communication partners is input data and whether the known communication partners are malignant or benign is output data;

calculating malignancy of the subject communication partner on the basis of the model and the characteristic information about the subject communication partner, wherein the characteristic information about the subject communication partner includes statistics of an Internet Protocol (IP) address group relevant to the communication partner and statistics of an IP domain name group relevant to the communication partner;

outputting the calculated malignancy as a value that indicates a degree of malignancy;

adding the subject communication partner to a blacklist based on the value, wherein the method further includes acquiring external information about the known communication partners and the subject communication partner and log information about correspondence relationships each between domain name and IP address and further extract, as the characteristic information, statistics of the external information about a relevant communication partner group extracted from the log information, and the known communication partners and the subject communication partner are domain names.

* * * * *